US007961961B2

(12) United States Patent
Hizume et al.

(10) Patent No.: US 7,961,961 B2
(45) Date of Patent: Jun. 14, 2011

(54) IMAGE PROCESSING APPARATUS AND IMAGE PROCESSING PROGRAM USING MOTION INFORMATION

(75) Inventors: Tarou Hizume, Ishikawa (JP); Manabu Yata, Ishikawa (JP); Kazunori Sumiya, Ishikawa (JP); Toshiyuki Sano, Kanagawa (JP)

(73) Assignee: Panasonic Corporation, Osaka (JP)

( * ) Notice: Subject to any disclaimer, the term of this patent is extended or adjusted under 35 U.S.C. 154(b) by 907 days.

(21) Appl. No.: 11/911,430

(22) PCT Filed: Mar. 16, 2006

(86) PCT No.: PCT/JP2006/305277
§ 371 (c)(1),
(2), (4) Date: Oct. 12, 2007

(87) PCT Pub. No.: WO2006/114951
PCT Pub. Date: Nov. 2, 2006

(65) Prior Publication Data
US 2009/0022408 A1    Jan. 22, 2009

(30) Foreign Application Priority Data
Apr. 19, 2005  (JP) ................. 2005-121218

(51) Int. Cl.
*G06K 9/36* (2006.01)
*G06K 9/40* (2006.01)
*G06K 9/46* (2006.01)
(52) U.S. Cl. .................... 382/236; 382/275
(58) Field of Classification Search .......... 382/232, 382/233, 236, 262, 264, 274, 275, 284; 375/240.19, 375/E7.036; 348/441, 446, 448, 451–453, 348/622, 701, 750, E5.109, E7.003; 358/486, 358/509
See application file for complete search history.

(56) References Cited

U.S. PATENT DOCUMENTS
4,665,437 A * 5/1987 Nicholson .................. 348/449
(Continued)

FOREIGN PATENT DOCUMENTS
EP    0 973 341 A2    1/2000
(Continued)

OTHER PUBLICATIONS de Haan, Gerard; "IC for Motion-Compensated De-interlacing, Noise Reduction, and Picture-Rate Conversion", IEEE Transactions on Consumer Electronics, Aug. 1, 1999, pp. 617-624, vol. 45, No. 3, New York, NY, US.
(Continued)

*Primary Examiner* — Amir Alavi
(74) *Attorney, Agent, or Firm* — Pearne & Gordon LLP (57) ABSTRACT

It is an object to provide an image processing apparatus and an image processing program in which motion information detected from an image is used for a different image processing corresponding to image information so that the detected motion information capable of easily synchronizing the image with the motion information to reduce a circuit scale is shared in a signal processing requiring a plurality of motion information. Motion information is detected by a motion detecting portion (102) from an image signal input to an image acquiring portion (101) and an image signal stored in a memory (104), a noise is reduced by a noise reducing portion (103) using the motion information which is detected, a moving object is detected by a motion detector portion (105), and an interlace progressive conversion is carried out in an IP converting portion (106), and furthermore, an image is coded in a coding portion (107).

6 Claims, 5 Drawing Sheets

U.S. PATENT DOCUMENTS

| | | | | |
|---|---|---|---|---|
| 4,933,765 | A * | 6/1990 | Schiff et al. | 348/474 |
| 5,329,309 | A * | 7/1994 | Dorricott et al. | 348/97 |
| 5,402,186 | A * | 3/1995 | Kawai | 348/448 |
| 6,014,182 | A * | 1/2000 | Swartz | 348/700 |
| 6,108,041 | A * | 8/2000 | Faroudja et al. | 348/446 |
| 6,124,900 | A * | 9/2000 | Clatanoff et al. | 348/701 |
| 7,375,760 | B2 * | 5/2008 | Kempf et al. | 348/441 |
| 7,502,071 | B2 * | 3/2009 | Matsuzaki et al. | 348/452 |
| 2008/0136965 | A1 * | 6/2008 | Burns et al. | 348/452 |
| 2008/0192142 | A1 * | 8/2008 | Sharman | 348/448 |
| 2009/0022408 | A1 * | 1/2009 | Hizume et al. | 382/236 |

FOREIGN PATENT DOCUMENTS

| | | |
|---|---|---|
| JP | 11-112871 | 4/1999 |
| JP | 2000-032494 | 1/2000 |
| JP | 2000-115719 A | 4/2000 |
| JP | 2002-330447 | 11/2002 |
| JP | 2003-179888 | 6/2003 |

OTHER PUBLICATIONS

Kelting, P., et al., "Improved Picture Quality Module MK7-V1 V0.9", Internet Citation, Dec. 11, 1997, pp. 1-77, XP009137079, Retrieved from the Internet: http://www.nxp.com/documents/application_note/AN97058,pdf, Retrieved Jan. 19, 2010.

Supplemental Search Report for Appl. No. EP 06729270.6 dated Aug. 26, 2010.

* cited by examiner

IMAGE PROCESSING APPARATUS AND IMAGE PROCESSING PROGRAM USING MOTION INFORMATION

This application is a 371 of PCT/JP2006/305277 filed on Mar. 16, 2006.

TECHNICAL FIELD

The present invention relates to an image processing apparatus and an image processing program which carry out an image processing using motion information on an image.

BACKGROUND ART

Conventionally, information indicative of an object moving in an image photographed by an image pick-up device such as a camera (which will be hereinafter referred to as motion information) has been utilized in various image processings. As an example, a cyclic type noise reduction processing of reducing a noise of an image is taken. The cyclic type noise reduction processing is a variable parameter low-pass filter in a time direction of an animation and can be expressed in the following transfer function by using a frame memory in one frame.

$$H(zF(0))=(1-K)/(1-KzF(-1))$$

wherein zF(−1) represents a unit delay operator for one frame.

The cyclic type noise reduction processing is the low-pass filter in the time direction as described above. Therefore, a moving portion is blurred on a time basis. A parameter K is varied within a range of 1>K>0 in the moving portion of an image in such a manner that the blur is included within a range of a visual afterimage and can be prevented from being a visual disturbance. In this case, K→1 is set in a stationary portion (the blur is not generated on principle) and K→0 is set in the moving portion (the blur is not generated and a noise reducing effect is deteriorated). In addition, the motion information is utilized for various uses, for example, "a three-dimensional luminance color separation", "an interlace progressive conversion", "a moving object detection" and "coding".

Figure 5:
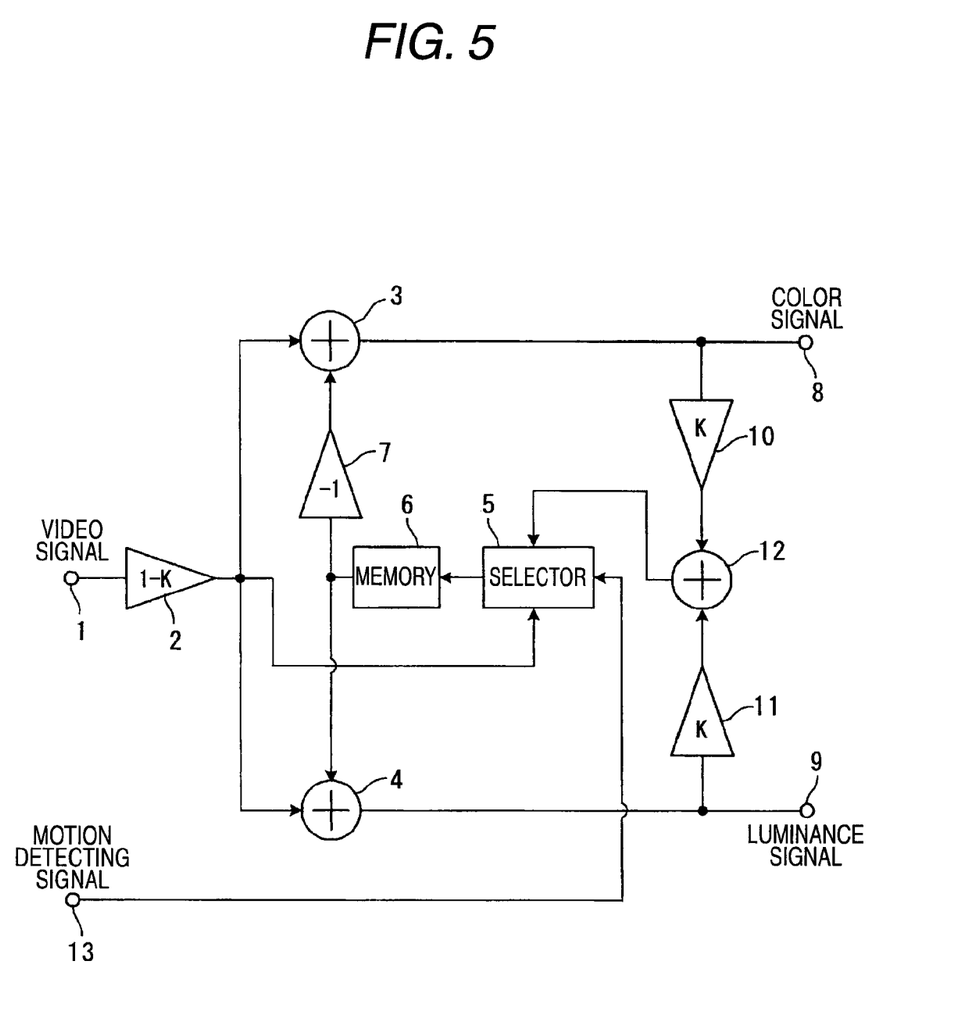
FIG. 5 is a block diagram showing a schematic structure of a conventional luminance color signal separating and noise reducing circuit.

In some conventional image processing apparatuses, a luminance color signal separating circuit and a noise reducing circuit are integrated with each other to share a memory (for example, see Patent Document 1). FIG. 5 is a block diagram showing schematic structures of the luminance color signal separating circuit and the noise reducing circuit which have been disclosed in the Patent Document 1. In FIG. 5, a composite video input signal supplied to an input terminal 1 is sent to adders 3 and 4 through a (1-K)-time weighting circuit 2. Moreover, a signal sent from the weighting circuit 2 is stored in a memory 6 through a selector 5 and a signal sent one frame before is supplied to the adder 3 through an inverting circuit 7, for example, and is directly supplied to the adder 4. Signals sent from the adders 3 and 4 are fetched from output terminals 8 and 9, respectively. Moreover, the signals sent from the adders 3 and 4 are added in an adder 12 through K-time weighting circuits 10 and 11 respectively and are stored in the memory 6 through the selector 5, and the switching of the selector 5 is controlled by a motion detecting signal supplied to a terminal 13. Then, a signal sent from the weighting circuit 2 is selected for a pixel subjected to a motion detection of the composite video input signal, for example.

Referring to a pixel from which the motion is not detected, an irregular noise component is reduced, and furthermore, a processing of separating a luminance signal and a color signal from the composite video signal is carried out. By increasing a value of the weighting K, it is possible to enhance the noise reducing effect. More specifically, a pixel in which a noise component is reduced is restricted to a pixel from which a motion is not detected. By increasing the value of K, therefore, it is possible to enhance the noise reducing effect. In the image processing apparatus, the memory is shared so that a cost can be reduced (Patent Document 1).

Patent Document 1: JP-A-2002-330447

DISCLOSURE OF THE INVENTION

Problems that the Invention is to Solve

However, the motion information of the image processing apparatus described in the prior art is set on a unit of a pixel. When a moving object is to be recognized from an image obtained after removing a noise from the motion information, another motion detecting unit is required. For this reason, there is a problem in that it is hard to make a synchronization and a circuit scale is increased.

The invention has been made in consideration of the circumstances and has an object to provide an image processing apparatus and an image processing program in which motion information detected from an image is used for a different image processing corresponding to image information so that the detected motion information capable of easily synchronizing the image with the motion information to reduce a circuit scale is shared in a signal processing requiring a plurality of motion information.

Means for Solving the Problems

The object can be achieved by the following structure and program.

(1) An image processing apparatus for carrying out an image processing for an image signal obtained by an image acquiring unit, includes a motion detecting unit for detecting motion information from image information in a plurality of frames obtained by the image acquiring unit, a noise reducing unit for reducing a noise included in the image signal by using the motion information detected by the motion detecting unit, a moving object detecting unit for detecting a moving object from the image signal subjected to the noise reduction processing by using the motion information detected by the motion detecting unit, an interlace progressive converting unit for converting the image signal to be handled by the image acquiring unit into a progressive image format by using the motion information detected by the motion detecting unit if the image signal is in an interlace image format, and a coding unit for coding image information transmitted from either the interlace progressive converting unit or the moving object detecting unit by using the motion information detected by the motion detecting unit.

By the structure, the detected motion information is shared by making a synchronization in each of the signal processings requiring a plurality of motion information, that is, a noise reduction processing, a moving object detection processing, an interlace progressive conversion processing and a coding processing. Therefore, the circuit can be shared and the image signal processing using the motion information can be carried out in a small circuit scale.

(2) The image processing apparatus according to the (1) includes a margin bit using motion information converting unit for inserting motion information into a margin bit of a video signal obtained from the image acquiring unit, a motion information expanding unit for matching phases of the image information and the motion information inserted into the margin bit of the video signal with each other, and a blanking period using motion information converting unit for inserting the motion information into a blanking period of the video signal.

By the structure, a memory capacity and a memory data bus can be used efficiently for a compensation of a processing delay, particularly, a processing delay on a unit of a frame, an image signal processing position is not restricted with a small increase in a circuit amount, and the detected motion information is shared by making a synchronization in each of signal processings requiring a plurality of motion information, that is, a noise reduction processing, a moving object detection processing, an interlace progressive conversion processing, a coding processing, a remainder bit using motion information conversion processing, a motion information expansion processing and a horizontal blanking using motion information conversion processing. Therefore, the circuit can be shared and an image signal processing using the motion information can be carried out in a small circuit scale.

(3) An image processing program for carrying out an image processing for an image signal obtained by an image pick-up device, and for causing a computer to execute each of steps, include a motion detecting step of detecting motion information from image information in a plurality of frames which is obtained by the image pick-up device, a noise reducing step of reducing a noise included in the image signal by using the detected motion information, a moving object detecting step of detecting a moving object from the image signal subjected to the noise reduction processing by using the detected motion information, an interlace progressive converting step of converting an image signal into a progressive image format by using the detected motion information if the image signal I to be handled by the image pick-up device is in an interlace image format, and a coding step of coding either image information obtained after the progressive image format conversion or image information obtained after the detection of the moving object by using the detected motion information.

Consequently, the detected motion information is shared by making a synchronization in each of the signal processings requiring a plurality of motion information, that is, a noise reduction processing, a moving object detection processing, an interlace progressive conversion processing and a coding processing. Therefore, the circuit can be shared and the image signal processing using the motion information can be carried out in a small circuit scale.

(4) The image processing program according to the (3) includes a margin bit using motion information converting step of inserting the motion information into a margin bit of a video signal obtained from the image pick-up device, a motion information expanding step of matching phases of the image information and the motion information inserted into the margin bit of the video signal with each other, and a blanking period using motion information converting step of inserting the motion information into a blanking period of the video signal.

Consequently, a memory capacity and a memory data bus can be used efficiently for a compensation of a processing delay, particularly, a processing delay on a unit of a frame, an image signal processing position is not restricted with a small increase in a circuit amount, and the detected motion information is shared by making a synchronization in each of signal processings requiring a plurality of motion information, that is, a noise reduction processing, a moving object detection processing, an interlace progressive conversion processing, a coding processing, a remainder bit using motion information conversion processing, a motion information expansion processing and a horizontal blanking using motion information conversion processing. Therefore, the circuit can be shared and an image signal processing using the motion information can be carried out in a small circuit scale.

Advantage of the Invention

In the image processing apparatus according to the invention, the detected motion information is shared by making a synchronization in each of the signal processings requiring a plurality of motion information, that is, a noise reduction processing, a moving object detection processing, an interlace progressive conversion processing and a coding processing. Therefore, the circuit can be shared and the image signal processing using the motion information can be carried out in a small circuit scale.

EXPLANATION OF DESIGNATIONS 100, 200 image processing apparatus
101 image acquiring portion
102 motion detecting portion
103 noise reducing portion
104 memory
105 motion detector portion
106 interlace progressive converting portion
107 coding portion
201 remainder bit using motion information converting portion
202 motion information expanding portion
203 horizontal blanking using motion information converting portion

BEST MODE FOR CARRYING OUT THE INVENTION

Preferred embodiments for carrying out the invention will be described below in detail with reference to the drawings.

First Embodiment

Figure 1:
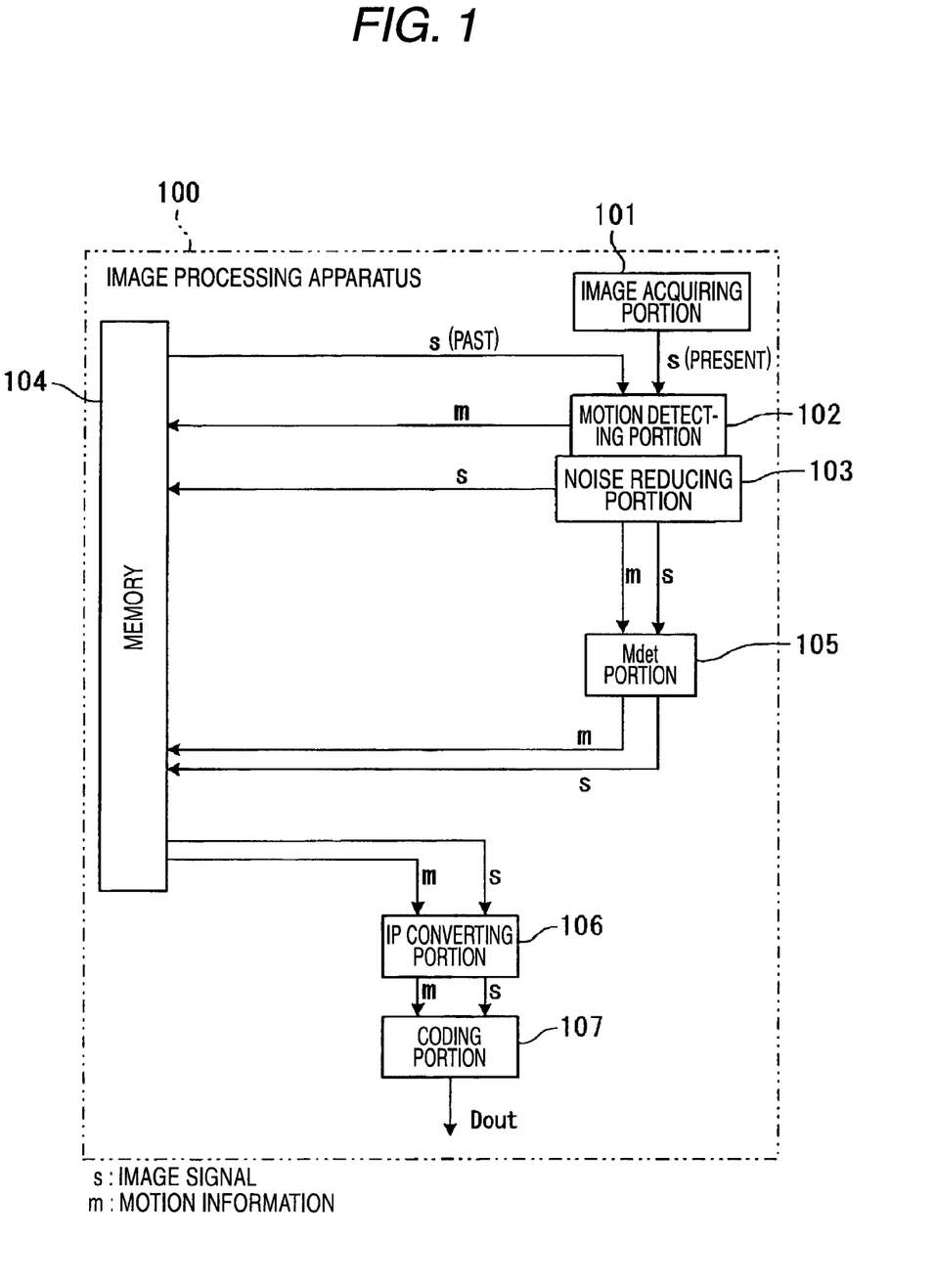
FIG. 1 is a block diagram showing a schematic structure of an image processing apparatus according to a first embodiment of the invention.

FIG. 1 is a block diagram showing a schematic structure of an image processing apparatus according to a first embodiment of the invention. In FIG. 1, an image processing apparatus 100 according to the embodiment comprises an image acquiring portion 101 for acquiring an image signal, a motion detecting portion 102 for detecting a motion in an image, a noise reducing portion 103 for carrying out a noise reduction processing using a frame memory, a memory 104, an Mdet (motion detector) portion 105 for detecting a moving object in an image, an IP (interlace progressive) converting portion 106, and a coding portion 107.

In the structure, a processing requiring motion information is carried out in the noise reducing portion 103, the Mdet portion 105, the IP converting portion 106 and the coding portion 107. The image acquiring portion 101 acquires an image signal. In this case, the image signal is acquired irrespective of a color and a monochrome, a time division color (a complementary color or a primary color), and a degree of sampling and quantization. The motion detecting portion 102 acquires the motion information by comparing the image signal acquired in the image acquiring portion 101 with an image signal stored in the memory 104. In this case, the image signal stored in the memory 104 is an image having a time difference from the image acquired in the image acquiring portion 101 at the present time. Moreover, it is desirable that the same pixels on a spatial basis should be compared with each other.

In the case in which the motion information are obtained in different fields, for example, it is desirable that a spatial position with one of image signals should be aligned by carrying out an interpolation over the other image signal and they should be thus compared with each other. Referring to a method of detecting the motion information, it is also possible to carry out a simple processing of comparing signal levels for respective pixels. If a throughput has a margin, moreover, the motion vector may be detected by a block matching processing. In the embodiment, all of them will be hereinafter referred to as motion information m.

The noise reducing portion 103 carries out low-pass filtering in a time direction. A cyclic type is preferable for a low-pass filter because a high noise reducing effect can be obtained with a small frame memory. It is assumed that a filter is set to be a variable parameter low-pass filter and is expressed in the following transfer function.

$$H(zF(0))=(1-K)/(1-KzF(-1))$$

zF(−1) is a unit delay operator in one frame.

A parameter K is varied within a range of 1>K>0 in a moving portion of an image in order not to cause a visual disturbance. The parameter K is generated as mapping of the motion information m detected in the motion detecting portion 102, and K→1 is set in a stationary portion and K→0 is set in the moving portion so that it is possible to carry out a cyclic type noise reduction processing of generating a blur with difficulties.

If an image signal subjected to the noise reduction processing is once stored in the memory 104 on a unit of a frame, it is possible to carry out a vertical inversion, a transverse inversion, a scale conversion in a perpendicular direction (an enlargement and a reduction), a barrel conversion and a pin cushion conversion by regulating order for reading a pixel from the memory 104. In this case, it is necessary to carry out the vertical inversion, the transverse inversion, and the enlargement and reduction processing over the motion information, thereby maintaining a spatially positional relationship with a pixel. If the conversion is not required, a noise reduction processing output may be directly input to the Mdet portion 105 in a next stage. In the embodiment, a noise reduction processing output image signal is directly input to the Mdet portion 105 in the next stage as a state in which the conversion is not executed.

The Mdet portion 105 detects an object moving really in the actual world from the motion information obtained in the motion detecting portion 102. In an execution of a pan and tilt in the case in which the image acquiring portion 101 is a camera having a pan and tilt function which can carry out a pan and a tilt, a motion is detected over a full screen when a scene change, and a physical vibration and blurring (a vibration of a place in which the camera is disposed or the unsteady hold of the camera itself) are generated. In such a situation, if the amount of a motion is detected as the motion information, an almost equal amount of motion information is obtained over a whole screen and motion information having directions and sizes of almost equal vectors are obtained in the whole screen if the motion vector is detected. In other words, the motion is detected from the whole screen. However, the full screen is not occupied by an object moving in the actual world. In this case, the object moving really in the actual world which is a photographic object is detected.

In order to detect the moving object, it is also possible to compensate for the motion information m by detecting a state in which uniform motion information is obtained over the full screen. If an angle or an angular velocity (not shown) is obtained as pan and tilt information, moreover, it is also possible to calculate, from the information, the motion information m which will uniformly appear over an image signal, thereby compensating for the motion information m which is actually obtained. Also in the case in which an angular velocity sensor (not shown) is attached to the image acquiring portion 101 to obtain information about a vibration or blurring, it is possible to detect the moving object from the motion information m in the same manner.

If a processing target image signal is of an interlace type, next, the image signal can be once stored in the memory 104 and can be thus converted into a progressive image by the IP converting portion 106. Referring to an interlace image, that is, an image obtained by an interscan, a plurality of images interpolating mutual spatial positions is rearranged in order of a spatial phase, thereby obtaining an original image (progressive: a progressive scanning image). In the case of a 2:1 interlace, an original image is obtained by rearranging two images having different spatial phases from each other in order of the spatial phase. An interlace image is picked up with a time difference. In the case in which a moving object is present in an image, an image acquiring condition such as an illuminance is changed or the image acquiring portion 101 itself is physically moved (that is, a vibration, blurring, and a pan and tilt), therefore, a comb-shaped image disorder is generated in a motion generating portion of the image when the rearrangement is simply carried out.

By using the motion information m detected in the motion detecting portion 102, accordingly, a pixel is interpolated in a portion in which the motion is detected. In the case in which a progressive image is created from an A field image and a B field image, image signals are rearranged alternately for A and B in a portion in which the motion is not detected and an image signal having one of field spatial phases is generated by an interpolation through the other field image signal, for example, in the portion in which the motion is detected.

In the case in which the image signal acquired in the image acquiring portion 101 is a progressive image, it is preferable to directly input an output of the Mdet portion 105 to the coding portion 107 through the IP converting portion 106 (a signal path is not shown).

Next, a dynamic image is coded in the coding portion 107. In general, interframe prediction coding utilizing a pixel correlation with a previous frame is used in coding of a dynamic image. In the coding, an interframe difference is coded. However, a motion compensating interframe prediction is used for enhancing a predicting effect. A spatial motion between the frames is detected every comparatively small region and is shifted correspondingly to carry out the interframe prediction. If the motion information m is a moving amount, an interframe prediction can be carried out when the detected moving amount is large and the interframe prediction can be carried out when the detected moving amount is small. In the case of a motion vector, it is possible to carry out the coding through the motion compensating interframe prediction.

According to the image processing apparatus 100 in accordance with the embodiment, thus, the detected motion information can be shared in each of the signal processings requiring a plurality of motion information, that is, the noise reduction processing, the moving object detection processing, the interlace progressive conversion processing and the coding processing. Therefore, it is possible to carry out an image signal processing using the motion information in a small circuit scale by sharing a circuit.

The image processing apparatus 100 according to the first embodiment has a function capable of recording a program on a recording medium such as a magnetic disk, a magneto-optic disk or an ROM. Accordingly, it is possible to implement the function of the image processing apparatus by reading the recording medium through a computer to execute the program by using an MPU (Micro Processing Unit) or a DSP (Digital Signal Processor). The program has the following steps.

A motion detecting step of detecting motion information from image information in a plurality of frames obtained by the image acquiring portion 101;

a noise reducing step of reducing a noise included in an image signal by using the motion information which is detected;

a moving object detecting step of detecting a moving object from the image signal subjected to the noise reduction processing by using the motion information which is detected;

an interlace progressive converting step of converting an image signal to be handled in the image acquiring portion 101 into a progressive image format by using the detected motion information if the image signal is in an interlace image format; and a coding step of coding either image information obtained after the progressive image format conversion or image information obtained after the detection of the moving object by using the detected motion information.

Second Embodiment

Figure 2:
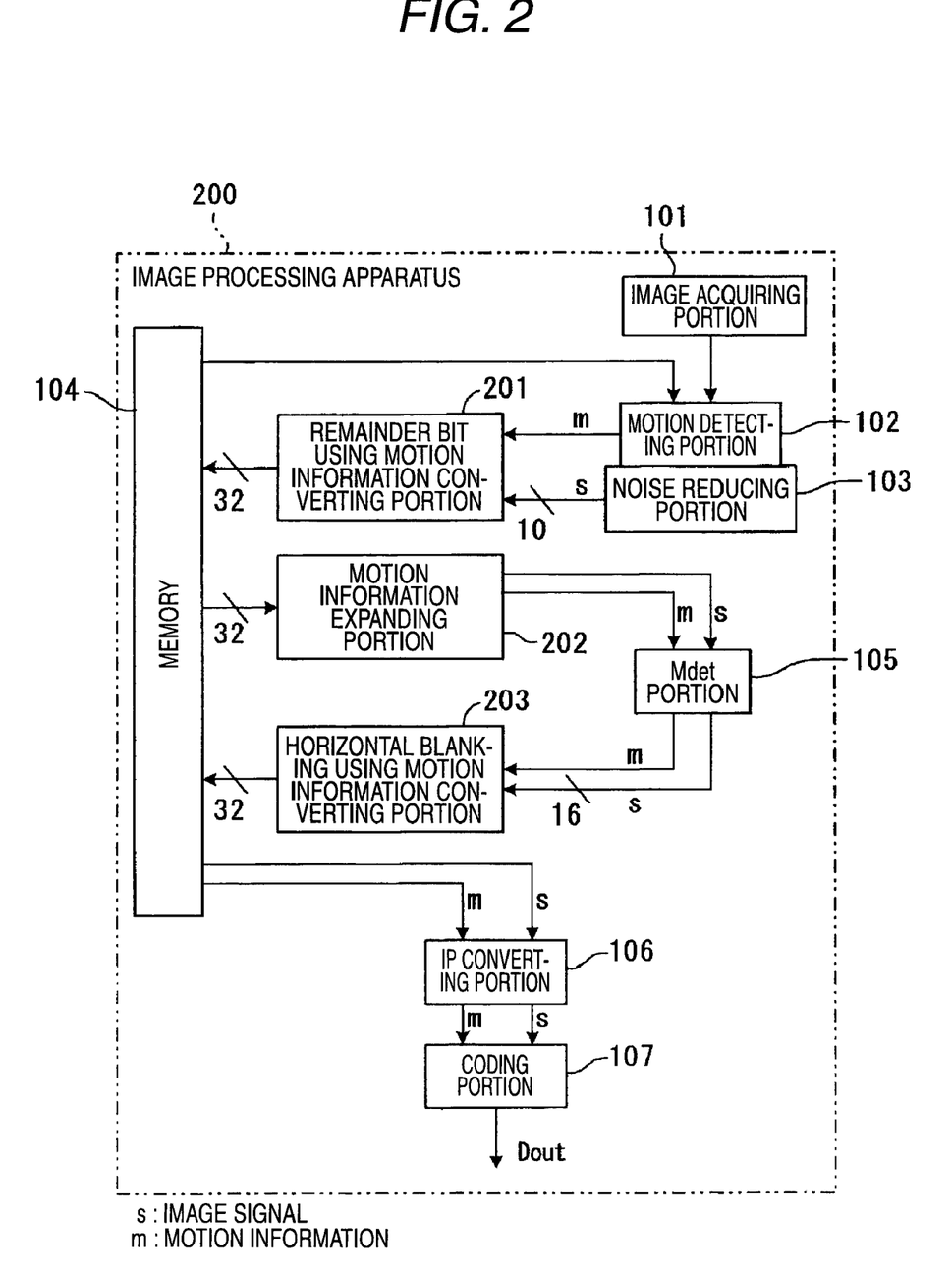
FIG. 2 is a block diagram showing a schematic structure of an image processing apparatus according to a second embodiment of the invention.

FIG. 2 is a block diagram showing a schematic structure of an image processing apparatus according to a second embodiment of the invention. The structure is almost the same as that of the first embodiment (FIG. 1) described above. A difference from the first embodiment will be described below with reference to FIGS. 2, 3 and 4.

In FIG. 2, an image processing apparatus 200 according to the second embodiment comprises a remainder bit using motion information converting portion 201, a motion information expanding portion 202 and a horizontal blanking using motion information converting portion 203 in addition to the image processing apparatus 100 according to the first embodiment. Referring to a general image, a general color image has a data volume of approximately 16 bits as YUV422 per pixel and raw data obtained from an image pick-up unit have a data volume of 10 bits or more per pixel in many cases. The YUV indicates a format representing a color by three information including a luminance signal (Y), a difference (U) between the luminance signal and a blue component, and a difference (V) between the luminance signal and a red component. While the output of the noise reducing portion 103 is input to the Mdet portion 105 in the first embodiment, furthermore, the remainder bit using motion information converting portion 201, the memory 104 and the motion information expanding portion 202 are provided therebetween in the second embodiment.

In the embodiment, it is assumed that an image signal obtained from the image acquiring portion 101 has 10 bits per pixel and an image signal output from the Mdet portion 105 has 16 bits per pixel. Furthermore, it is assumed that a data bus width of the memory 104 according to the embodiment has 32 bits. In the embodiment, moreover, there is employed a structure in which it is possible to carry out a vertical inversion, a transverse inversion, a scale conversion in a perpendicular direction (an enlargement and a reduction), a barrel conversion and a pin cushion conversion, for example, by once storing a signal output from the noise reducing portion 103 in the memory 104 on a unit of a frame and regulating order for reading a pixel from the memory 104. In this case, motion information is also subjected to the vertical inversion, the transverse inversion, and the enlargement and reduction processing to maintain a spatially positional relationship with a pixel. In other words, it is also necessary to store the motion information in the memory 104.

Figure 3:
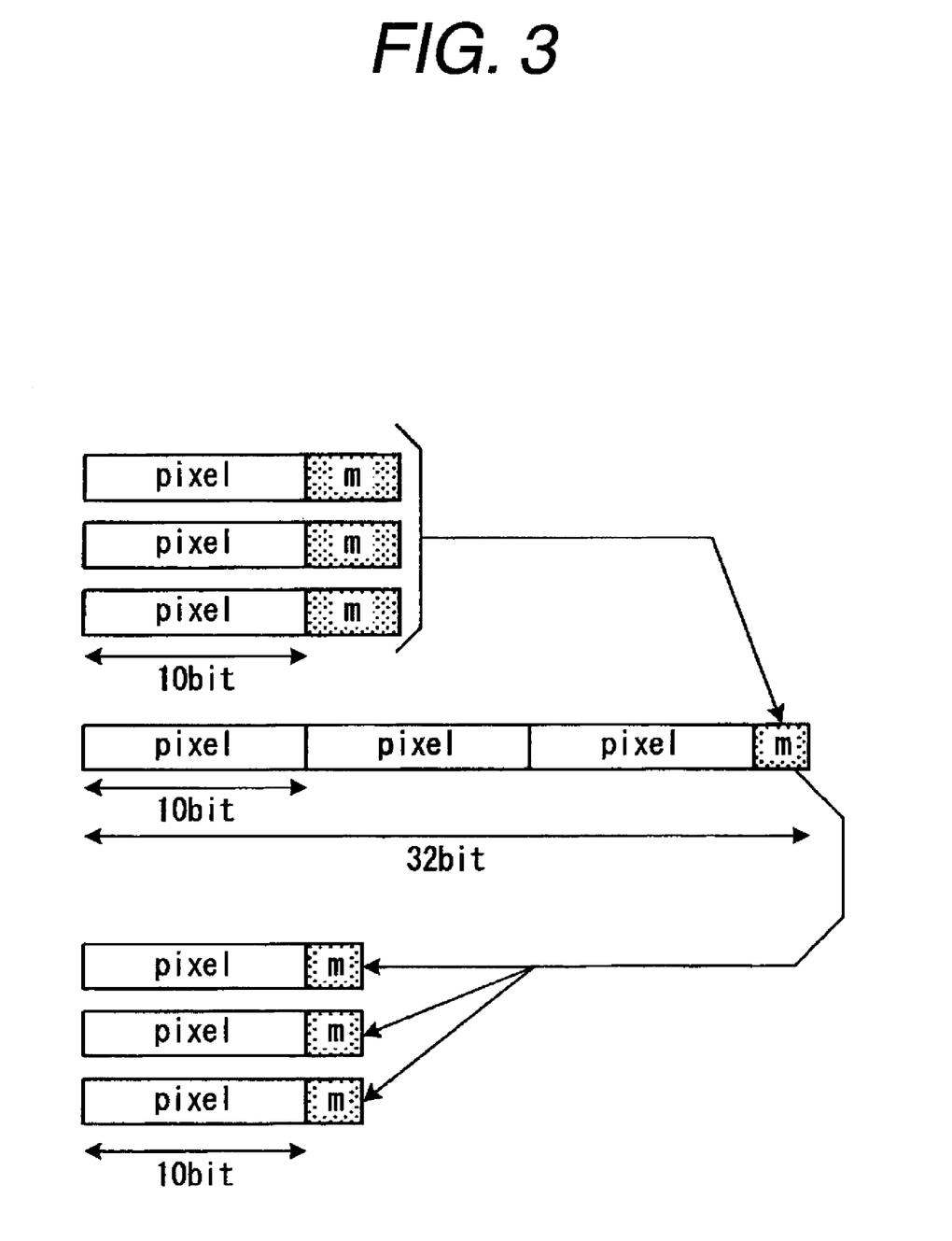
FIG. 3 is a diagram showing a summary of a remainder bit using motion information conversion and motion information expansion processing in the image processing apparatus of FIG. 2.

The motion information detected by the motion detecting portion 102 will be supposed. The remainder bit using motion information converting portion 201 converts motion information corresponding to three pixels into 2 bits and inserts the 2 bits into pixel data 30 bits corresponding to three pixels of the output of the noise reducing portion 103, thereby constituting 32 bits which are equal to the data bus width. FIG. 3 is a diagram showing a summary of a reminder bit using motion information conversion and motion information expansion processing. As shown in FIG. 3, pixel data having 10 bits per pixel are added to have 30 bits for three pixels, and motion information corresponding to the three pixels are converted into 2 bits.

In the case in which the memory data bus has a margin, it is possible to efficiently store the image signal and the motion information in the memory 104. In order to collect the motion information corresponding to three pixels into 2 bits, it is possible to propose a method of calculating a maximum value, a minimum value and a mean value of the three motion information to take upper 2 bits or a method of obtaining two data from the three motion information through a selection or averaging to set 1-bit motion information by a threshold processing and to assign two motion information to 2 bits. For example, it is apparent from an experiment that a method of assigning upper 2 bits of a maximum one of three values is preferable for an IP conversion processing to be one of post-processings, for example. When three pixels and motion information of 32 bits are read from the memory 104, they are input to the Mdet portion 105 in a subsequent stage in a state in which the spatial phases of the pixel and the motion information are matched with each other by the motion information expanding portion 202.

Figure 4:
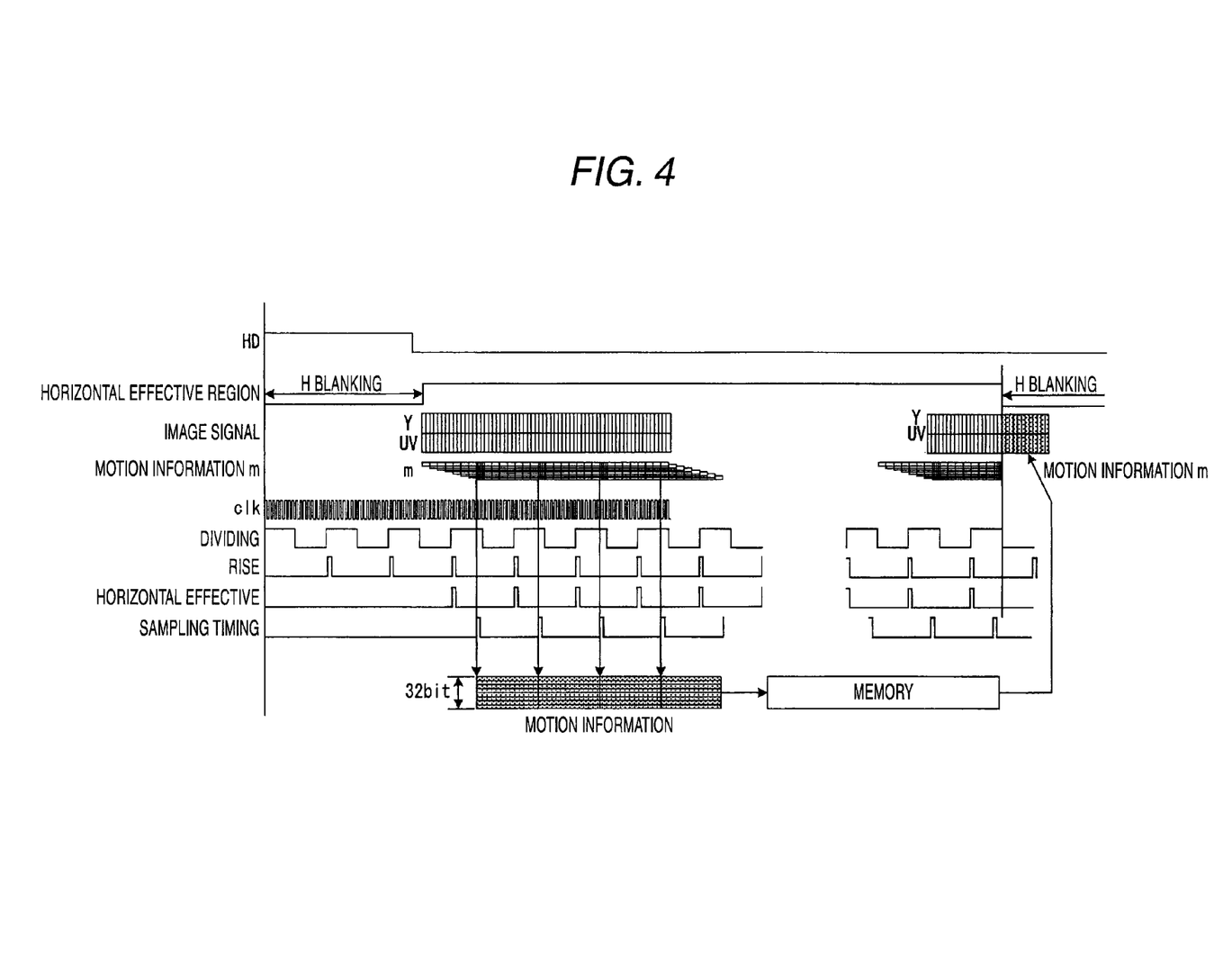
FIG. 4 is a diagram showing a summary of a horizontal blanking using motion information conversion processing in the image processing apparatus of FIG. 2.

Furthermore, the image signal output from the Mdet portion 105 and the motion information will be considered. The horizontal blanking using motion information converting portion 203 constitutes 32 bits corresponding to two pixels because the image signal has 16 bits per pixel. At this time, the 32 bits are equal to the memory data bus width. In this case, therefore, a plurality of motion information corresponding to 32 bits is collected in a lump to insert the motion information into horizontal blanking (H blanking) of a video. FIG. 4 is a diagram showing a summary of a horizontal blanking using motion information conversion processing. In the case in which the memory data bus has no margin, it is possible to store the image signal and the motion information in the memory. The motion information stored in the H blanking is expanded in such a manner that the spatial phases of the pixel and the motion information are matched with each other, and are thus used in an IP conversion. In the embodiment, thus, it is possible to synchronize the motion information with the image information to decrease a data volume to be held by holding the motion information and the image information on a single pixel unit or a plurality of pixel units.

According to the image processing apparatus 200 in accordance with the embodiment, moreover, a memory capacity and a memory data bus can be efficiently used for a compensation of a processing delay, particularly, a processing delay on a unit of a frame, and a video signal processing position is not restricted with a small increase in a circuit amount and the detected motion information is shared in each of the signal processings requiring a plurality of motion information, that is, the noise reduction processing, the moving object detection processing, the interlace progressive conversion processing, the coding processing, the remainder bit using motion information conversion processing, the motion information expansion processing and the horizontal blanking using motion information conversion processing. Therefore, it is possible to share the circuit and to carry out an image signal processing using the motion information in a small circuit scale.

In the same manner as the image processing apparatus 100 according to the first embodiment, the image processing apparatus 200 according to the second embodiment has a function capable of recording a program on a recording medium such as a magnetic disk, a magneto-optic disk or an ROM. Accordingly, it is possible to implement the function of the image processing apparatus by reading the recording medium through a computer to execute the program by unit of an MPU or a DSP. The program has the following steps in addition to the steps described in the first embodiment.

A margin bit using motion information converting step of inserting motion information into a margin bit of a video signal sent from the image acquiring portion 101;

a motion information expanding step of matching phases of image information and the motion information inserted into the margin bit of the video signal with each other; and a blanking period using motion information converting step of inserting the motion information into a blanking period of the video signal.

While the invention has been described in detail with reference to the specific embodiments, it is apparent to the skilled in the art that various changes and modifications can be made without departing from the spirit and scope of the invention.

The application is based on Japanese Patent Application (Japanese Patent Application No. 2005-121218) filed on Apr. 19, 2005 and contents thereof are incorporated by reference.

INDUSTRIAL APPLICABILITY

The invention has an advantage that an image processing using motion information can be carried out in a small circuit scale by sharing a circuit, and can be applied to a monitoring apparatus such as a person tracking apparatus for tracking a person, for example.

The invention claimed is:

1. An image processing apparatus for carrying out an image processing for an image signal obtained by an image acquiring unit, comprising:

a motion detecting unit which detects motion information from image information in a plurality of frames obtained from the image acquiring unit;

a noise reducing unit which reduces a noise included in the image signal by using the motion information detected by the motion detecting unit;

a moving object detecting unit which detects a moving object from the image signal subjected to the noise reduction processing by using the motion information detected by the motion detecting unit;

an interlace progressive converting unit which converts the image signal into a progressive image format by using the motion information detected by the motion detecting unit if the image signal to be handled by the image acquiring unit is in an interlace image format; and a coding unit which codes image information transmitted from either the interlace progressive converting unit or the moving object detecting unit by using the motion information detected by the motion detecting unit.

2. The image processing apparatus according to claim 1, further comprising:

a margin bit using motion information converting unit which inserts the motion information into a margin bit of the video signal obtained from the image acquiring unit;

a motion information expanding unit which matches phases of the image information and the motion information inserted into the margin bit of the video signal with each other; and a blanking period using motion information converting unit which inserts the motion information into a blanking period of the video signal.

3. The image processing apparatus according to claim 2, wherein the motion detecting unit detects the motion information on a pixel basis from the image signal of a plurality of frames obtained from the image acquiring unit;

wherein the margin bit using motion information converting unit converts a bit amount of the motion information of a predetermined number of pixels into a predetermined bit so that the predetermined bit is inserted into a margin bit in a data bus width of a data bus in a memory for storing the noise-reduced image signal and the motion information; and wherein the motion information expanding unit matches a phase of the noise-reduced image signal with a phase of the motion information of the predetermined bit obtained from the memory.

4. The image processing apparatus according to claim 3, wherein the margin bit using motion information converting unit calculates a maximum value, a minimum value or a mean value of the motion information of the predetermined number of pixels and extracts the predetermined bit in upper side in the calculated value of the motion information of the predetermined number of pixels.

5. A non-transitory computer-readable medium having an image processing program stored thereon, wherein the image processing program carries out an image processing for an image signal obtained by an image pick-up device, and causes a computer to execute each of steps, comprising:

a motion detecting step of detecting motion information from image information in a plurality of frames obtained from the image pick-up device;

a noise reducing step of reducing a noise included in the image signal by using the detected motion information;

a moving object detecting step of detecting a moving object from the image signal subjected to the noise reduction processing by using the detected motion information;

an interlace progressive converting step of converting an image signal into a progressive image format by using the detected motion information if the image signal to be handled by the image pick-up device is in an interlace image format; and a coding step of coding either image information obtained after the progressive image format conversion or image information obtained after the detection of the moving object by using the detected motion information.

6. The non-transitory computer-readable medium of claim 5, wherein the image processing program causes the computer to execute each of the steps, further comprising:

a margin bit using motion information converting step of inserting the motion information into a margin bit of a video signal obtained from the image pick-up device;

a motion information expanding step of matching phases of the image information and the motion information inserted into the margin bit of the video signal with each other; and a blanking period using motion information converting step of inserting the motion information into a blanking period of the video signal.

* * * * *

UNITED STATES PATENT AND TRADEMARK OFFICE
CERTIFICATE OF CORRECTION

PATENT NO. : 7,961,961 B2
APPLICATION NO. : 11/911430
DATED : June 14, 2011
INVENTOR(S) : Tarou Hizume et al.

It is certified that error appears in the above-identified patent and that said Letters Patent is hereby corrected as shown below:

In column 5, line 46, please "÷", and insert thereof -- → --.

Signed and Sealed this
Twenty-second Day of November, 2011

David J. Kappos
*Director of the United States Patent and Trademark Office*